United States Patent
Ong

(10) Patent No.: US 12,052,647 B2
(45) Date of Patent: Jul. 30, 2024

(54) MANAGEMENT OF WIRELESS SERVICE TO MINIMIZE DISRUPTION

(71) Applicant: Comcast Cable Communications, LLC, Philadelphia, PA (US)

(72) Inventor: Ivan Ong, Malvern, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 104 days.

(21) Appl. No.: 17/240,408

(22) Filed: Apr. 26, 2021

(65) Prior Publication Data

US 2022/0345988 A1    Oct. 27, 2022

(51) Int. Cl.
*H04W 48/02* (2009.01)
*H04W 48/16* (2009.01)
*H04W 72/542* (2023.01)

(52) U.S. Cl.
CPC ........... *H04W 48/02* (2013.01); *H04W 48/16* (2013.01); *H04W 72/542* (2023.01)

(58) Field of Classification Search
None
See application file for complete search history.

(56) References Cited

U.S. PATENT DOCUMENTS

| | | | |
|---|---|---|---|
| 9,961,696 B2 * | 5/2018 | Wang | H04W 72/1215 |
| 10,264,590 B2 | 4/2019 | Abraham et al. | |
| 10,560,850 B2 | 2/2020 | Fischer et al. | |
| 2008/0126531 A1 * | 5/2008 | Setia | H04W 48/02 709/224 |
| 2010/0179704 A1 * | 7/2010 | Ozog | H02J 7/35 703/2 |
| 2011/0103392 A1 * | 5/2011 | Fan | H04L 45/38 370/401 |
| 2014/0172782 A1 * | 6/2014 | Schuenzel | G06F 3/0605 707/609 |
| 2015/0319695 A1 * | 11/2015 | Huang | H04W 56/001 370/311 |
| 2017/0111253 A1 * | 4/2017 | Girish | H04W 4/02 |
| 2017/0208623 A1 | 7/2017 | Bate et al. | |
| 2019/0208502 A1 * | 7/2019 | Du | H04B 7/155 |
| 2020/0044688 A1 | 2/2020 | Padden et al. | |
| 2020/0059843 A1 * | 2/2020 | Tang | H04W 36/0069 |
| 2022/0132531 A1 * | 4/2022 | Ko | H04W 28/0278 |

FOREIGN PATENT DOCUMENTS

| | | |
|---|---|---|
| EP | 3193560 A1 | 7/2017 |
| KR | 10-1342391 B1 | 12/2013 |

* cited by examiner

*Primary Examiner* — Jeffrey M Rutkowski
*Assistant Examiner* — Mehedi S Aley
(74) *Attorney, Agent, or Firm* — BakerHostetler

(57) ABSTRACT

Methods and systems are described for managing communication. A computing device may be configured to manage a first wireless service and a second wireless service. An interruption schedule may be used to limit transmissions associated with a first wireless service. The computing device may override the interruption schedule based on various override rules.

17 Claims, 6 Drawing Sheets

MANAGEMENT OF WIRELESS SERVICE TO MINIMIZE DISRUPTION

BACKGROUND

A variety of different types of computing devices may be deployed at a premises or other location. If the devices use different protocols, a gateway device that manages the devices may have multiple wireless radios or services to enable communication based on the different protocols. Some protocols, however, may cause transmissions that interfere with each other. Conventional approaches may cause too much disruption to a particular wireless service. Thus, there is a need for more sophisticated techniques for managing wireless services.

SUMMARY

Methods and systems are described for managing communication. A computing device, such as a gateway device (e.g., or access point), may be configured to manage a first wireless service and a second wireless service. The second wireless service may have a lower transmission power than the first wireless service. An interruption process (e.g., schedule, rules) may be used to limit transmissions associated with the first wireless service. The interruption process may disable (e.g., block, turnoff, power down, pause) the first wireless service according to a duty cycle. The interruption process may allow for transmissions to be received and/or sent via the second wireless service with less disruption (e.g., or no disruption) from the first wireless service. The interruption process may be managed based on rules. The rules may specify various override conditions. The override conditions may be based on connection information associated with the user device. Connection information may comprise any information, characteristics, attribute, and/or the like associated with a connection between two devices. The connection of the first device with the first wireless service changes in quality over time, resulting in the computing device overriding the interruption process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
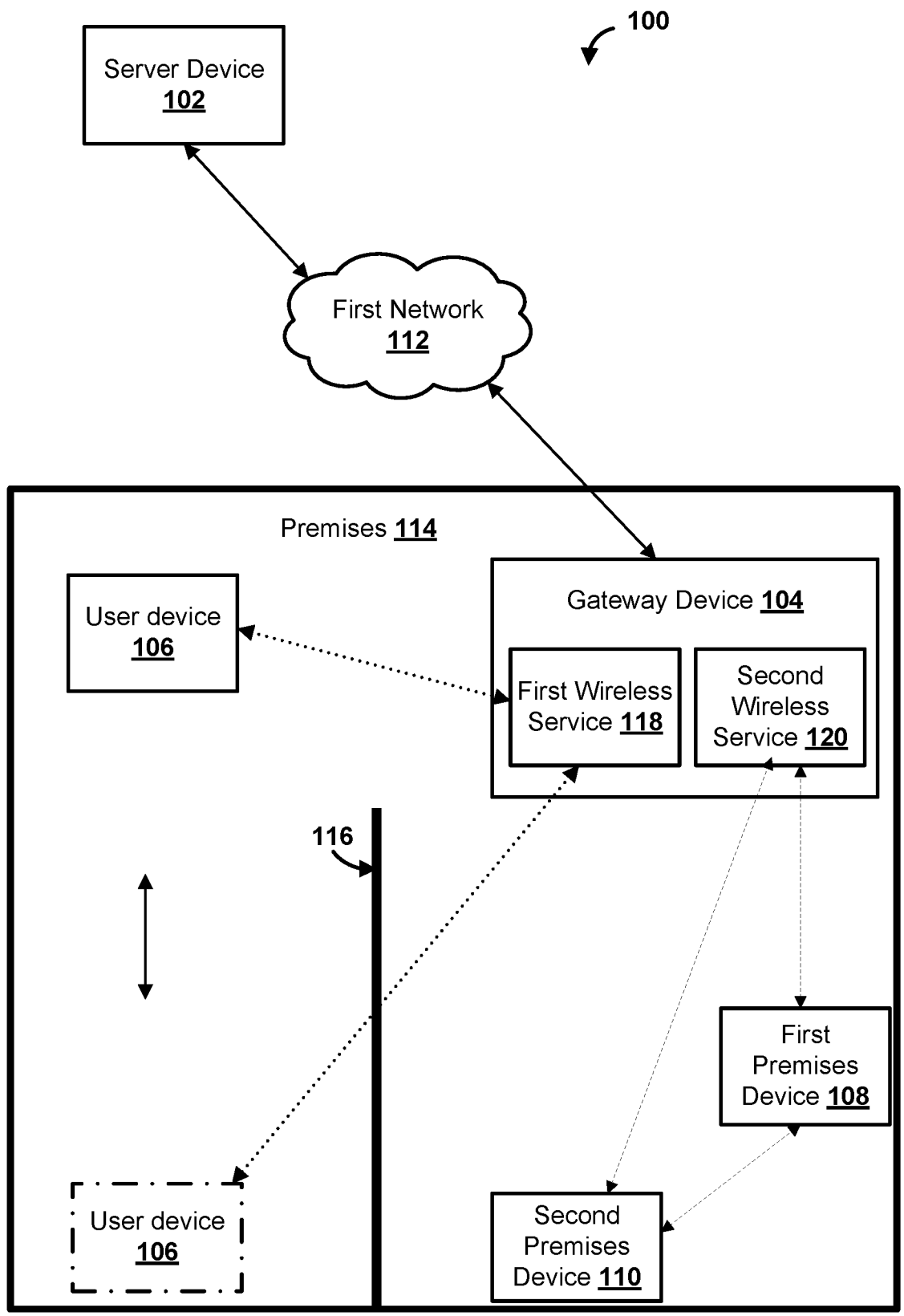
FIG. 1 shows a block diagram of an example system for communication.

A computing device, such as a gateway, router, access point, and/or the like, may be configured to use an interruption process (e.g., conflict process, management process, service management process, scheduling process, resource sharing process) to manage potential conflicts between a first wireless service (e.g., WiFi radio) and a second wireless service (e.g., Zigbee, Bluetooth radio). The term interruption process may refer any process that manages conflicts and/or resource sharing between the first wireless service and the second wireless service regardless of whether the process involves interrupting a wireless services, process, schedule, and/or the like.

The second wireless service may not be able to communicate (e.g., or may have degraded communication) if the first wireless service is operating. The first wireless service may have a stronger signal than the second wireless service, resulting communication associated with the second wireless service being overpowered, jammed, delayed, and/or otherwise degraded. The interruption process may comprise a pulse width modulation (PWM) process in which various transmission slots of the first wireless service are paused (e.g., blocked, prevented from being used), at least in part (e.g., briefly 'sliced' or having a portion of the transmission slot removed/blocked in the time domain). This interruption process may allow devices associated with the second wireless service to have an opportunity to communicate with the computing device. The transmission slots may be reserved time slots if the current modulation techniques occur in the time domain (e.g., WiFi, ZigBee, Bluetooth low energy). By blocking portions of the transmission timeslots at predefined intervals and for a certain duration, the signal to noise ratio (SNR) of the first wireless service may be limited to allow the the secondary wireless service to have improved communication.

The computing device may be configured to apply an interruption process according to various parameters, such as a duty cycle, interval time, duration time, and/or the like. For purposes of illustration, an interruption process (e.g., PWM process) may be applied according to the parameters described below and shown in Tables 1-2. It should be noted that these parameters may vary according to many factors and are only used for illustration. The parameters may vary according to the number and type of wireless radios as well as other conditions. Tests were performed for a wireless gateway comprising one WiFi radio, one Zigbee radio, and one Bluetooth low energy radio. The following example lengths of time were determined: 39 ms, 78 ms, or 127 ms. These time lengths represent total time the wireless service may be disabled (e.g., blocked, turned off, powered down, paused) during a time period (e.g., 100 ms, 1 s). Different duty cycles may be applied to these time lengths, as illustrated in Table 1, which shows total time the wireless service (e.g., WiFi) is disabled due to the interruption process per 100 ms interval as well as 1 sec. It should be noted that Table 1 is only an example set of data, and a variety of different duty cycles and pulse widths may be used to implement the disclosed techniques in a variety of different contexts.

TABLE 1

| PWM | 10% duty cycle (100 ms interval/1 s interval) | 15% duty cycle (100 ms interval/1 s interval) | 20% duty cycle (100 ms interval/1 s interval) | Frequency occurrence within 1 s |
|---|---|---|---|---|
| 39 ms (2.56 cycles/100 ms (25.6 cycles/ 1 s) | 10 ms/100 ms | 15 ms/150 ms | 20 ms/200 ms | 26× |
| 78 ms (1.28 cycles/100 ms (12.8 cycles/ 1 s) | 10 ms/100 ms | 15 ms/150 ms | 20 ms/200 ms | 13× |
| 127 ms (0.78 cycles/100 ms (7.87 cycles/ 1 s) | 10 ms/100 ms | 15 ms/150 ms | 20 ms/200 ms | 8× |

Each of the above values can be assigned a duty cycle, such as a duty cycle of 10, 15, or 20 percent (e.g., or up to 10, up to 15, or up to 20 percent). For example, in a 100 ms interval, given the configuration of 39 ms and 10% duty cycle, there may be 2.56 cycles each carrying a duration of 10 ms where the first wireless service is interrupted (e.g., transmissions are disabled or otherwise prevented). This results in a theoretical reduction of 10% throughput of the first wireless service. Depending on the configuration, the duration may be in a range of 10 ms to 20 ms. Reduction in throughput and frequency of occurrence may range between 8 to 26 times per second.

The interruption process may be disruptive to the first wireless service. This disruption may degrade user experience if not managed effectively. The present disclosure improves over conventional approaches by more effectively managing the disruption of the first service. High bandwidth connections, such as media streams, speed tests, downloads, and/or the like may experience service degradation if pulse width modulation techniques are applied. This result could have a high and unnecessary impact, especially if there are no devices nearby that use the second wireless service for transmissions. Table 2 shows bandwidth measurements for various configuration settings for an example interruption process using PWM.

TABLE 2

| PWM | Measured Iteration #1 (Mbps) | Measured Iteration #2 (Mbps) | Measured Iteration #3 (Mbps) |
|---|---|---|---|
| Baseline (No PWM) | 164 | 165 | 166 |
| 39 ms 10% duty cycle | 47 | 49 | 44.4 |
| 39 ms 20% duty cycle | 44 | 41 | 37.2 |
| 78 ms 10% duty cycle | 89.5 | 96.9 | 96.3 |
| 78 ms 20% duty cycle | 82.1 | 82.2 | 84.7 |
| 127 ms 10% duty cycle | 106 | 103 | 114 |
| 127 ms 20% duty cycle | 95 | 89 | 100 |

As shown in Table 2, a throughput degradation ranging from 40% and above may be detected starting with the least detrimental PWM frequency of 127 ms. Under the example conditions, additional analysis such as out Range vs Orientation (RvO) test uncovered throughput degradation ranging between 25%-45% onwards when the link is saturated with high throughput for an extensive duration at any angles even at Line of Sight (LOS) best case scenario.

Based on this data (e.g., or other data optimized for a different device and/or location), a computing device (e.g., wireless gateway router, access point, user device, premises device) that employs the interruption process may not need to be enabled if there are no services associated with the account second wireless service, such as Internet of Things (IoT) based services. Even if a user account has services associated with the second wireless service, the interruption process can be dynamically configured to either temporarily disable or be less disruptive until a link state associated with the first wireless service improves.

Disclosed herein are techniques for dynamic configuration of an interruption process. The configuration and/or reconfiguration of the interruption process may be based on intelligent scheduling, logic detection, configuration detection (e.g., based on pre-checks of certain attributes whether local or remote server based), link state sensing, frame analysis, or a combination thereof. The interruption process may be disabled completely if the user account associated with a computing device does not have any associated services that utilize the second wireless service. The interruption process may be disabled (e.g., or limited) if only a few IoT devices (e.g., or other premises devices) are located at the premises, the IoT devices do not transmit often, the IoT devices are associated with a lower priority (e.g., lighting devices instead of security devices), or a combination thereof. A server comprising user account information may be periodically (e.g., upon boot up, at regular times, upon detection of a signal from the second wireless service) queried to determine if any services are enabled associated with the second wireless service. If these services are enabled, the dynamic interruption process may be enabled. Otherwise, the interruption process may be disabled.

The interruption process may be dynamically adjusted based on connection information associated with the first wireless service, such as latency, modulation rates, link capacity usage, and/or the like. If latency or modulation rates are decreasing and/or if the link is achieving capacity due to a large file download, the interruption process may be decreased, throttled, paused, disabled, and/or the like to prevent interruption of the link/session. Connection information can be determined by taking advantage of current attributes that are already collected (e.g., for dissociation/ association decisions) to adjust settings of the interruption process to a more disruptive configuration, a less disruptive configuration, or temporarily disabled configuration. Connection information may comprise 802.11k/v/r attributes (e.g., which informs an access point of a neighboring AP and its respective received signal strength (RSSI), signal to noise ratio (SNR), supported data rates, service set identifier (SSID), channel utilization). A subset of these attributes may be sufficient to decide whether to throttle the interruption process or whether to restore the original settings of the interruption process. The interruption process may take into account the connection information (e.g., usage of the first wireless service), usage information associated the second wireless service (e.g., by a premises device, internet of things device), or a combination thereof. The need for a large amount of bandwidth from the first wireless service may be balanced, for example, with the low or high need for communication with premises devices associated with the second wireless service.

FIG. 1 shows a block diagram of an example system 100 for communication. The system 100 may comprise a server device 102, a gateway device 104, a user device 106, one or more premises devices (e.g., a first premises device 108, and a second premises device 110), or a combination thereof. It should be noted while the singular term device is used herein, it is contemplated that some devices may be implemented as a single device or a plurality of devices (e.g., via load balancing). The server device 102, the gateway device 104, the user device 106, the one or more premises devices, may each be implemented as one or more computing devices. Any device disclosed herein may be implemented using one or more computing nodes, such as virtual machines, executed on a single device and/or multiple devices.

The server device 102, the gateway device 104, the user device 106, the first premises device 108, the second premises device 110, may be communicatively coupled via one or more networks, such as a first network 112 (e.g., a wide area network) and one or more second networks (e.g., one or more local area networks). The first network 112 may comprise a content distribution and/or access network. The first network 112 may facilitate communication via one or more communication protocols. The first network 112 may comprise fiber, cable, a combination thereof. The first network 112 may comprise wired links, wireless links, a combination thereof, and/or the like. The first network 112 may comprise routers, switches, nodes, gateways, servers, modems, and/or the like.

The one or more second networks (e.g., shown as dashed lines between the gateway device 104 and other devices) may comprise one or more networks in communication with the gateway device 104. The one or more second networks may comprise one or more networks at a premises 114. The premises 114 may be a customer premises. The premises 114 may include an area within a coverage range (e.g., wireless range) of the gateway device 104. The premises 114 may comprise a property, dwelling, terminal, building, floor, and/or the like. The premises 114 may comprise different rooms, walls, door, windows, and/or the like. One room of the premises 114 may be separated from another room via a wall 116. The user device 106 may move within the premises 114 as illustrated by the solid arrow showing different positions of the user device 106 at the top and bottom of the diagram.

The one or more premises devices may be located at the premises 114. The one or more premises devices (e.g., the first premises device 108, the second premises device 110, or other computing device) may comprise one or more of a camera, a sensor, a security system, a security controller, a gateway device, a smoke detector, a heat sensor, a door sensor, a motion sensor, a window sensor, a thermostat, a microphone, a personal assistant, a door lock, an irrigation device, or a combination thereof. The one or more premises device (e.g., the first premises device 108, the second premises device 110, or other computing device) may be configured to generate premises data. The premises data may comprise a sensor state, a setting, audio, video, images, text information, premises mode, or a combination thereof. The one or more premises devices (e.g., the first premises device 108, the second premises device 110, or other computing device) may be configured to send the premises data to the server device 102, the user device 106, or a combination thereof.

The server device 102 may be configured to provide one or more services, such as account services, application services, network services, content services, or a combination thereof. The server device 102 may comprise services for one or more applications on the user device 106. The server device 102 may generate application data associated with the one or more application services. The application data may comprise data for a user interface, data to update a user interface, data for an application session associated with the user device 106, and/or the like. The application data may comprise data associated with access, control, and/or management of the premises 114. The application data may comprise the premises data, updates to the premises data, and/or the like.

The server device 102 may be configured to determine to send information (e.g., configuration settings, notifications, information about the premises) to the user device 106, the gateway device 104, or a combination thereof. The server device 102 may comprise information rules associating various values, patterns, account information, and/or the like with corresponding information. The server device 102 may detect a change in the premises data from the one or more premises devices. The server device 102 may analyze the premises data and determine that an information rule is triggered. The information may be sent to the user device 106 based on the information rule being triggered and/or satisfied. The information may comprise at least a portion of the premises data, such as an image, video, sensor state (e.g., motion detected, window open, window closed, door open, door closed, temperature, measured particle level, smoke detected, heat detected) and/or the like.

The information may comprise a configuration setting of the gateway device 104. The configuration setting may be a configuration setting for one or more wireless services of the gateway device 104, as explained further herein. The configuration setting may comprise an interruption schedule, an override of the interruption schedule, a setting to enable a service (e.g., wireless service, premises service, security service, automation service, content service), a setting to disable a service, a change of an account setting, and/or the like. The information may be sent to the gateway device 104 based on a change in an account setting associated with an account associated with gateway device 104. The change may be associated with enabling and/or subscribing to a service, disabling and/or unsubscribing to a service, a combination thereof, and/or the like.

The user device 106 may comprise a computing device, a smart device (e.g., smart glasses, smart watch, smart phone), a mobile device, a tablet, a computing station, a laptop, a digital streaming device, a set-top box, a streaming stick, a television, and/or the like. The user device 106 may be configured to communicate with the gateway device 104, the server device 102, the one or more premises devices, and/or the like. The user device 106 may be configured to output a user interface. The user interface may be output via the user interface via an application, service, and/or the like, such as a content browser. The user interface may receive application data from the server device 102. The application data may be processed by the user device 106 to cause display of the user interface.

The user interface may be displayed on a display of the user device 106. The display may comprise a television, screen, monitor, projector, and/or the like. The user interface may comprise a premises management application, a premises automation application, a premises security application, network services application, or a combination thereof. The user interface may be configured to output status information associated with the premises (e.g., status information of the one or more premises device and/or gateway device 104). The application may be configured to allow control of and/or sending commands to the premises (e.g., to the one more premises devices and/or the gateway device 104). The user interface may be configured to allow a user to configure settings associated with the gateway device 104, such as wireless service settings, interruption schedule settings (e.g., duty cycle setting, override rules, override conditions, frequency for interruption of a wireless service), and/or the like.

The gateway device 104 may be comprise a computing device, an access point (e.g., wireless access point), a router, a modem, device controller (e.g., automation controller, security controller, premises health controller) a combination thereof, and/or the like. The gateway device 104 may be configured to communicate using the one or more second networks at the premises 114. The gateway device 104 may be configured to implement one or more services associated with the server device 102 (e.g., or with the premises 114, a user account), such as a content service, a premises service, an automation service, a security service, a health monitoring service, or combination thereof.

The gateway device 104 may comprise (e.g., or have, be configured to implement) a first wireless service 118. The first wireless service 118 may be implemented via a first wireless radio of the gateway device 104. The first wireless service (e.g., first wireless radio) may be configured to communicate using (e.g., only using) a first protocol (e.g., WiFi, 802.11 based protocol). The gateway device 104 may comprise a second wireless service 120. The second wireless service 120 may be implemented via a second wireless radio (e.g., or the first wireless radio in some implementations) or the gateway device 104. The first wireless service 118 (e.g., or first wireless radio) may have a higher transmission power than a transmission power of the second wireless service (e.g., or second wireless radio). The second wireless service 120 may be configured to communicate using (e.g., only using) a second protocol (e.g., a ZigBee, a Bluetooth, Bluetooth low energy, a Z-wave service, a mesh wireless protocol, and/or the like).

The gateway device 104 may be configured to enable (e.g., cause to be enabled) an interruption schedule (e.g., or interruption process). The interruption schedule may be enabled based on analysis performed by the gateway device 104. Another device, such as a server (e.g., the server device 102) located external to the premises, a premises device (e.g., sensor, security controller), a user device, and/or the like may cause the gateway device 104 to enable the interruption schedule.

The interruption schedule may specify timing information for limiting transmissions associated with the first wireless service 118. The interruption schedule may specify timing information for limiting transmissions associated with the first wireless service 118 without limiting transmissions associated with a second wireless service of the gateway device. Without limiting transmission may refer to without adding additional limitations to the second protocol. The transmissions of the first wireless service may be limited to allow transmissions for the second wireless service. It should be noted that the second protocol may have programmed interruptions, but these interruptions may be separate from the interruption schedule. The interruption schedule may be configured to not modify operations of the second wireless service 120 (e.g., but may only modify the first wireless service 118).

The interruption schedule may comprise a duty cycle specifying a time length to limit transmission during a time window. Limiting transmission associated with the first wireless service 118 may comprise one or more of reducing power of the first wireless service 118, preventing usage of the first wireless service 118, disabling the first wireless service 118, blocking the first wireless service 118, or pausing the first wireless service. The interruption schedule may comprise a pulse width modulation (PWM) based schedule. Table 1 shows example details for an interruption schedule.

The interruption schedule may be enabled based on a user account setting, detection of service, installation of a premises device, activation of a service (e.g., a premise service, automation service, security service, home health service), a combination thereof, and/or the like. The gateway device 104 may detect a communication via the second wireless service 120. The gateway device 104 may enable the interruption schedule based on the detecting of the communication via the second wireless service 120.

It may be determined (e.g., by the gateway device 104, by the server device 102) that a user account associated with the gateway device 104 has a service associated with the second wireless service 120 enabled. The gateway device 104 may receive information from the server device 102 and/or user device indicating that the service associated with the second wireless service 120 is enabled. A user may subscribe to the service, via the user interface of the user device 106. The user device 106 may send application data to the server device 102 indicating that the user subscribed to the service. The server device 102 may send information to the gateway device 104 causing the gateway device 104 to enable the second wireless service 120 based on determining that the user account associated with the gateway device 104 has the service associated with the second wireless service 120 enabled.

The gateway device 104 may be configured to determine connection information associated with one or more of the first wireless service 118 or the second wireless service. Connection information may comprise any information, characteristics, attribute, and/or the like associated with a connection between two devices, such as a connection between the gateway device 104 and the user device 106 or a connection between the gateway device 104 and a premises device (e.g., the first premises device 108, the second premises device 110). The connection information may be associated with the user device 106 communicating with the first wireless service 118. The connection information may comprise one or more of a connection quality parameter or a user location parameter. As shown in FIG. 1, the user device 106 may move (e.g., indicated by the solid arrow within the premises 114) around the premises 114 resulting in changes in connection information, connection quality parameters, user location parameters, and/or the like. The gateway device 104 may be configured to periodically analyze the connection information.

The connection information (e.g., the connection quality parameter) may comprise a measurement of one or more of a modulation rate, a link adaptation rate, a link quality indicator, received signal strength parameter, or a proprietary link parameter. The connection information (e.g., the user location parameter) may be based on geolocation, signal analysis (e.g., signal strength, modulation rate), triangulation (e.g., from multiple access points), and/or the like. The connection information may be used to determine a location of a user device. The location may comprise a distance from the gateway device 104. Specific values associated with corresponding parameters (e.g., or combination and/or patterns of values of parameters) may be used to determine one or more estimated distances between the gateway device 104 and the user device 106. The one or more distances may be used to triangulate to determine a location within a room and/or premises.

The connection information may comprise and/or be based on a signal to Noise Ratio (SNR). The connection information may comprise and/or be based on 802.11 beacon data rates. The data rates may be per wireless radio, such as per WiFi 2.4 GHz or 5 GHz radio. As an illustration, data rates determined may comprise, for example, 6, 9, 12, 18, 24, 36, 48, 54 Mbps (e.g., or any other rate). The connection information may comprise and/or be based on a wireless mode, such as an 802.11 mode (e.g. HT/VHT/HE). A wireless mode may comprise a High Throughput (HT) mode (e.g., 802.11n), a Very High Throughput (VHT) mode (e.g., 802.11ac), a High Efficiency (HE) mode (e.g., 802.11ax), and/or the like. The connection information may comprise and/or be based on a modulation type (e.g., 16-QAM, 64-QAM, 256-QAM, 1024-QAM). The connection information may comprise and/or be based on a modulation coding scheme (MCS) index, MCS type, a combination thereof, and/or the like. In some scenarios, modulation rate, MCS index, MCS type may each separately or in combination be used to provide a more definitive set of connection information. Any combination of connection information may be used by an algorithm and/or analysis process to determine connection information, determine a location of the user device 106, a combination thereof, and/or the like.

Determining the connection information may comprise analyzing data in a transmission (e.g., via the first wireless service, or the second wireless service). The connection information may be determined based on analyzing a message, a message header, a packet header, a packet frame, a header field of a message, a body of a message, and/or a combination thereof. Determining connection information may comprise determining identifying information (e.g. a network address) in a communication message. The connection information may be associated with the first wireless service and/or the second wireless service (e.g., also referred to as additional connection information). The one or more override rules may associate the network address with an override setting. The network address may be associated with one or more of a quality of service requirement, a bandwidth requirement, or a latency requirement. A first type of device (e.g., gaming device, work computer, streaming device, door sensor, window sensor, smoke sensor, outdoor camera) may have a higher quality of service requirement than a second type of premises device (e.g., device associated with a secondary profile, lighting device, hallway sensor, indoor camera). A message may be analyzed to determine a corresponding premises device that sent the message. A data store may be queried to determine a device type of the premises device. The device type may be used to determine a matching quality of service requirement, a bandwidth requirement, and/or a latency requirement. These requirements and/or priorities may be determined as connection information.

The gateway device 104 may be configured to cause an override of the interruption schedule. The override of the interruption schedule may be caused based on the connection information satisfying one or more override rules. The one or more override rules may comprise a rule associating a connection quality parameter measurement with a threshold connection quality. The rule may indicate override the interruption schedule if the connection quality parameter measurement may be below the threshold connection quality. Causing the override of the interruption schedule may comprise preventing the first wireless service from being limited by the interruption schedule.

The one or more override rules may associate one or more override conditions with corresponding override settings. An override setting may be a configuration setting of the gateway device (e.g., that controls the operation of the first wireless service, the second wireless service, or a combination thereof). An override setting may be a setting to prevent the interruption schedule from being implemented, a setting to disable the interruption schedule, a setting to disable the interruption schedule for a time period, a setting to modify the interruption schedule, or a combination thereof.

An override condition may comprise one or more of a connection quality parameter satisfying a threshold, a connection quality parameter being below a threshold, a connection quality parameter being above a threshold, a user location parameter satisfying a threshold, a user location parameter indicating the user device is beyond a threshold distance from the gateway device, a user location parameter indicating that the user device with within a threshold distance from the gateway device, the presence of a value in a transmission, the presence of a combination of values in one or more transmissions, a value in a transmission being above, a value in transmission being below a threshold, a value in a transmission matching a value in a list of values, combination thereof, and/or the like. An example value may comprise a header field value, network address, data field value, destination address, and/or the like. An example transmission may comprise a transmission received via the first wireless service, a transmission received via the second wireless service, a transmission received by the gateway device, a combination thereof, and/or the like.

The one or more override rules may associate a network address (e.g., or application, domain, port, session identifier, protocol) with an override setting. The network address (e.g., or application, domain, port, session identifier, protocol) may be associated with one or more of a quality of service requirement, a bandwidth requirement, or a latency requirement. The one or more override rules may comprise a rule associating a connection quality parameter measurement with a threshold connection quality. The rule may indicate to override the interruption schedule if the connection quality parameter measurement falls below the threshold connection quality.

If the interruption schedule is caused to be overridden, then the gateway device 104 does not use (e.g., at least temporarily) the interruption schedule to cause interruptions to the first wireless service 118. Interruptions may still occur in the overridden configuration, but these interruptions may be due to other operations, factors, usage, and/or the like not caused by the interruption schedule. The gateway device 104 may be configured to resume the interruption schedule if one or more conditions are met. A condition may comprise an override rule no longer being satisfied, lapsing of a time period, receipt of an updated configuration setting (e.g., from the user device 106, the server device 102), a combination thereof, and/or the like.

The gateway device 104 may be transmitting data to user device 106. The user device 106 may be streaming video content in HD and/or performing high bit rate streaming using a WiFi radio (e.g., the first wireless service 118). This network activity may prevent a Zigbee radio (e.g., the second wireless service 120) of the gateway device 102 from receiving alerts from a door sensor (e.g., first premises device 108, second premises device 110). The disclosed techniques allow for balancing the interest of the user in maintaining a high quality user experience with the need to communicate urgent information that could affect the safety of the user. The door may be opened and/or other similar event occur (e.g., a pre-defined polling message to check that the door sensor is still communicating). The gateway device 102, while transmitting data using the WiFi radio, may receive a Zigbee packet from the door sensor. The Zigbee packet may be stored in a queue (e.g., while the WiFi radio is transmitting). The gateway device 102 may read a frame header of the Zigbee packet in the queue and determine to transmit a 'check in' packet to the door sensor to indicate that the gateway device 102 is still present and operating.

The gateway device 104 may determine identifying information (e.g., destination address or other information) of the door sensor based on the Zigbee packet (e.g., the frame header). The gateway device 104 may determine that the door sensor is valid (e.g., an authorized device associated with the user, premises, and/or user account) based on the identifying information. The gateway device 104 may determine (e.g., based on/in response to determining the door sensor is valid) whether to wait to transmit during a time defined by an interruption schedule, or whether to override the interruption schedule. The determination may be made based on determining a type of message of the received message. The type of message may be compared to one or more types of messages associated with override conditions. If the message is a polling message, then the gateway device 104 may determine to wait until the next available transmission slot according to the interruption schedule. This approach allows for less interruption of the user experience (e.g., less likely to trigger buffering or downgrade in resolution for the HD stream) for scenarios in which communication from the sensor is less critical. If the message is a door sensor (e.g., higher priority message type) message, then the gateway device 104 may determine to override the interruption schedule. This approach allows for critical information to be communicated to the user or other monitoring device more quickly. The gateway device 104 may 'slice' (e.g., take a time slot from) a few milliseconds from the WiFi radio transmission period (e.g., from the video data steam) to allow transmission of the Zigbee packet. The gateway device 104 may send information in message to the door sensor to inform the door sensor to check back in a few milliseconds and for how long the door sensor should transmit (e.g., transmission duration) in the event the window of opportunity may be small/large to receive the a response message from the door sensor.

Figure 2A:
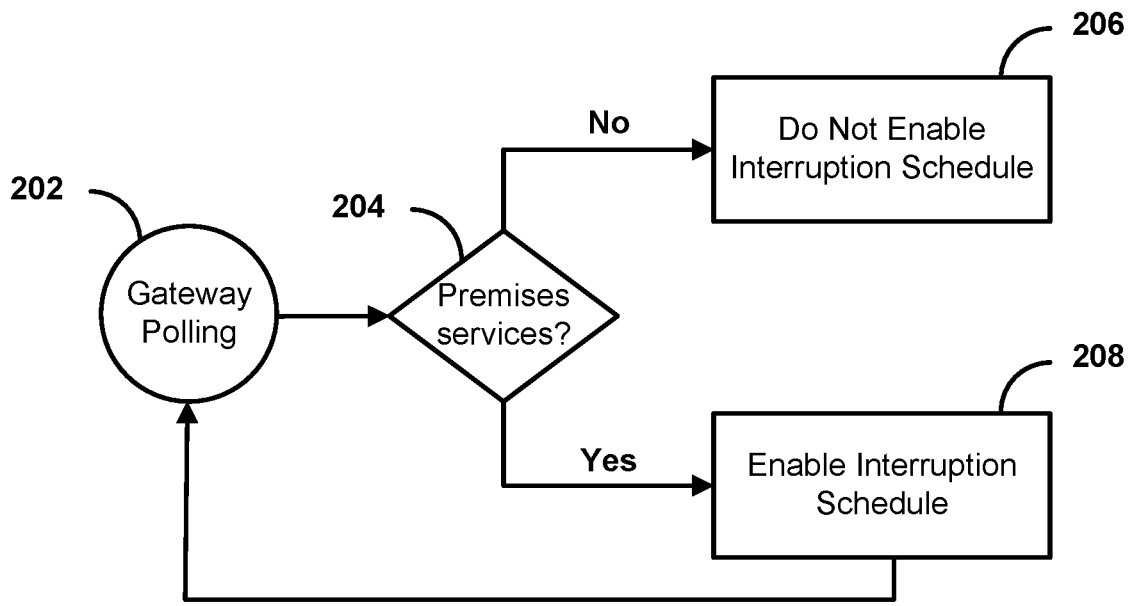
FIG. 2A shows a diagram of an example process for configuring a device.

FIG. 2A is a diagram showing an example process for configuring a gateway device 104. At step 202, the gateway device may perform backend polling, such as polling to a server, to discover the current services associated with a premises and/or user account. The gateway device 104 may receive a list of services currently associated with the premises and/or user account. At step 204, a determination may be made on whether any of the services are associated with an interruption schedule (e.g., or the second wireless service 120, the second protocol). If a service is not associated with the interruption schedule, then at step 206, the gateway device 104 may determine not to enable the interruption schedule. If a service is associated with the interruption schedule, then at step 208, the gateway device 104 may enable the interruption schedule. An example service associated with the interruption schedule may comprise an Internet of Things (IoT) service, a premises service, an automation service, a security service, and/or the like.

Figure 2B:
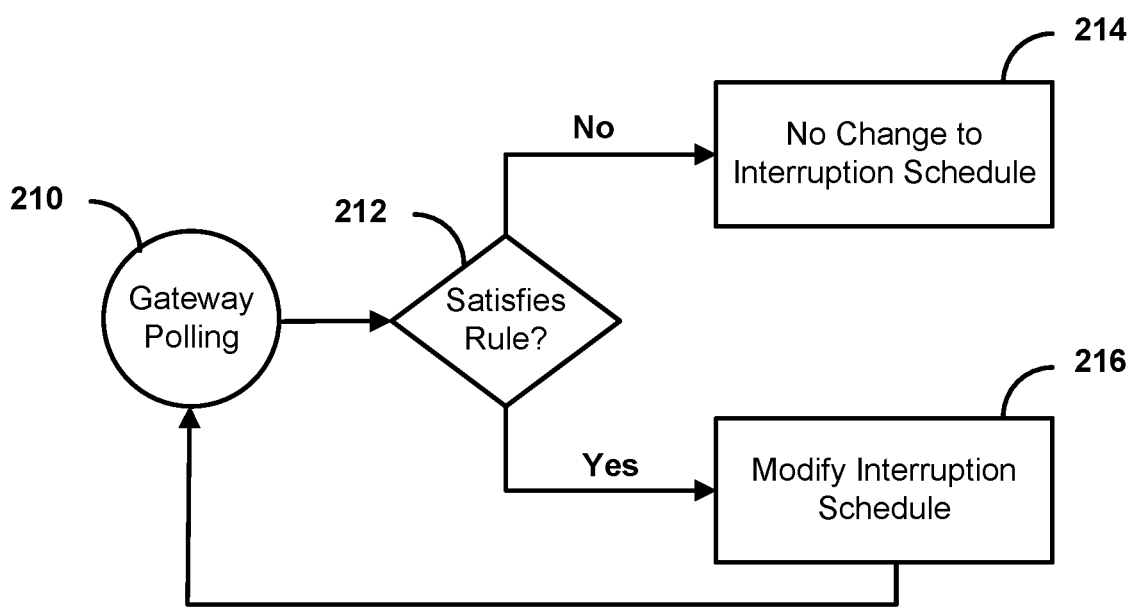
FIG. 2B shows a diagram of an example process for configuring a device.

FIG. 2B is a diagram showing another example process for configuring a gateway device 104. At step 210, the gateway device 104 may perform polling on a current connection to determine connection information, such as connection information associated with the first wireless service 118. The polling may comprise polling of IEEE 802.11 k/v/r attributes. The connection information (e.g., the IEEE 802.11 k/v/r attributes) may comprise existing link information between the gateway device 104 and the user device 102 used to manage the link. The existing link information may be associated with determining whether the user device 102 should associate with the gateway device 104. The connection information (e.g., link information) may comprise received signal strength (RSSI), signal to noise ratio (SNR), link rates, SSIDs for other base stations, and/or the like.

The connection information may comprise task information. The task information may comprise an indication of a task (e.g., task type, task identifier) associated with a connection between the gateway device 104 and the user device 102. The task may comprise a streaming task, downloading task, video task, audio task, gaming task, content browsing task, a combination thereof, and/or the like. The connection information may comprise a priority of the task. The connection information may comprise application information. The application information may comprise an indication of an application (e.g., application type, application identifier) associated with a connection between the gateway device 104 and the user device 102. The application may comprise a streaming application, content application, video application, browsing application, audio application, a combination thereof, and/or the like. The connection information may comprise a priority of the application The connection information may comprise transmission information associated with a transmission between the gateway device 104 and the user device 102. The transmission information may comprise an amount of data transmitted, a total file size associated with the transmission, a data rate of the transmission, a type of packet used for the transmission, a combination thereof and/or the like.

At step 212, the gateway device 104 may analyze the connection information to determine whether the connection information satisfies one or more override rules. Analyzing the connection information may comprise comparing the link information, the task information, the application information, the transmission information separately or in combination to one or more thresholds. Analyzing the connection information may comprise comparing the link information, the task information, the application information, the transmission information separately or in combination to one or more rules. A rule may associate any combination of link information, the task information, the application information, the transmission information, and/or the like with corresponding action, such as changing the interruption schedule. If the connection information indicates a large file is being download (e.g., based on file size determined from connection information), then the gateway device 104 may determine than an override rule is satisfied. Conflict between override rules may be resolved based on use. If no override rules are satisfied, then at step 214, the gateway device 104 may determine to make no changes to the interruption schedule (e.g., and the gateway device 104 may continue to interrupt the first wireless service 118 based on the interruption schedule). If an override rule is satisfied, then at step 216, the gateway device 104 may modify the interruption schedule. The interruption schedule may be overridden, disabled, and/or the like. A duty cycle parameter may be changed to decrease an amount of interruption within a time period.

Figure 3:
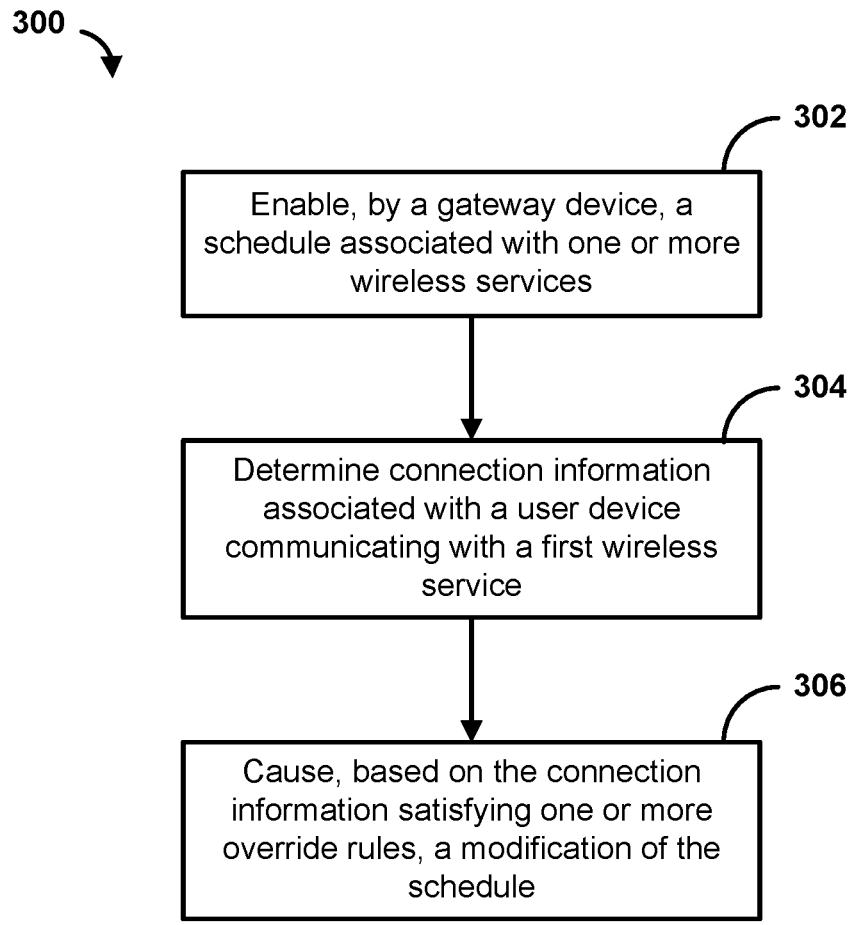
FIG. 3 shows a flowchart of an example method.

FIG. 3 shows a flowchart of an example method. The method 300 may comprise a computer implemented method for providing a service (e.g., a communication service, network service). A system and/or computing environment, such as the system 100 of FIG. 1 and/or the computing environment of FIG. 6, may be configured to perform the method 300.

At step 302, a schedule may be enabled. The schedule may be associated with one or more of a first wireless service or a second wireless service. The schedule may comprise an interruption schedule associated with interrupting the first wireless service. The schedule may be enabled by a gateway device. The gateway device may be located at a premises (e.g., a customer premises). Another device, such as a server located external to the premises, a premises device (e.g., sensor, security controller, security device, automation device, monitoring device, heating and air conditioning device), a user device, and/or the like may cause the gateway device to enable the interruption schedule. The premise device and/or user device may be located at the premises. A user may communicate with the server to enable a service. The enabling of the service may cause the server to send a message to the gateway device to enable any local services associated with the enabled services. The local service may comprise the service (e.g., a service to manage conflict between multiple wireless services).

The gateway device may comprise (e.g., or have, be configured to implement) the first wireless service (e.g., using a first wireless radio, first protocol). The gateway device may comprise the second wireless service (e.g., using a second wireless radio or the first wireless radio, second protocol). In some implementations, the second wireless service may be comprised in an additional device different from the gateway device, such as another gateway device, an access point, a hub, and/or the like. The first wireless service may have a higher transmission power than a transmission power of the second wireless service. The first wireless service may comprise a WiFi service. The second wireless service may comprise a ZigBee service, a Bluetooth service, a Z-wave service, a mesh wireless service, and/or the like.

The schedule (e.g., interruption schedule) may indicate (e.g., or specify) timing information for limiting transmissions associated with one or more wireless services, such as the first wireless service. Limiting transmissions associated with the first wireless service may be based on (e.g., scheduled and/or used to allow, enable, provide opportunity for) transmissions associated with the second wireless service. The schedule may indicate (e.g., or specify) timing information for limiting transmissions associated with the first wireless service to allow (e.g., without limiting) transmissions associated with the second wireless service. The schedule may not modify operations of the second wireless service. The schedule may comprise a duty cycle indicating (e.g., or specifying) a time length to limit transmission during a time window. Limiting transmission associated with the first wireless service may comprise one or more of reducing power of the first wireless service, preventing usage of the first wireless service, or disabling the first wireless service. Pre-existing parameters extracted from client connectivity may be combined with wireless gateway link connectivity to determine connection information (e.g., which may be indicative of or further combined with location information associated the user device). The connection information may be used to determine at what times and for how long of a duration transmit power should be adjusted and/or interrupted to minimize RF interference.

The schedule may be enabled based on a user account setting, detection of service, installation of a premises device, activation of a service (e.g., a premise service, automation service, security service, home health service), a combination thereof, and/or the like. A communication via the second wireless service may be detected. The communication may be from the premises device. The premises device may be located at the premises. The premises device may send the communication in response to being one or more of activated, turned on, detecting a change in a sensor state, reaching a notification triggering threshold, a combination thereof, and/or the like. Enabling the interruption schedule may comprise enabling the schedule based on the detecting of the communication via the second wireless service. It may be determined that a user account associated with the gateway device has a service associated with the second wireless service enabled. Enabling the schedule may comprise enabling the schedule based on determining that the user account associated with the gateway device has the service associated with the second wireless service enabled. If the premises device is a camera, the camera may attempt to associate with the second wireless service. The message attempting association may cause the interruption schedule to be enabled. The schedule may be enabled based on additional conditions, such as the usage of both the first wireless service and the second wireless service for a time period threshold.

At step 304, connection information associated with a user device communicating with the first wireless service may be determined. The connection information may comprise one or more of a connection quality parameter or a user location parameter. The connection information may comprise physical layer (e.g., or link layer) connection information, such as a measurement of one or more of a modulation rate, a link adaptation rate, a link quality indicator, received signal strength parameter, or a proprietary link parameter. The connection information may comprise network layer information (e.g., packet information, packet type), application layer information (e.g., application using the network, application type, task being performed by the application, task type), a combination thereof, and/or the like. The connection information may be determined based on analyzing data received from the user device (e.g., via the first wireless service). The connection information (e.g., network layer information, application layer information) may be determined by analyzing a message, a message header, a packet header, a packet frame, a header field of a message, a body of a message, and/or a combination thereof. The connection information may comprise a type of service (e.g., video service, web service, high bandwidth service, low bandwidth service), name of a service, a combination thereof, and/or the like.

Additional connection information may be determined. The additional connection information may be associated with the second wireless service, a premises device communicating with the second wireless service, or a combination thereof. The additional communication information may be determined based on analyzing data in a transmission. The additional connection information may be determined based on analyzing a message, a message header, a packet header, a packet frame, a header field of a message, a body of a message, and/or a combination thereof. Determining the connection information may comprise determining a network address in a communication message. The one or more override rules may associate the identifying information (e.g., network address) with an override setting. The network address may be associated with one or more of a quality of service requirement, a bandwidth requirement, or a latency requirement.

At step 306, a modification to a schedule may be caused. The schedule may be associated with the first wireless service may associated with one or more of the first wireless service or the second wireless service. The schedule may comprise the interruption schedule. Causing a modification of the schedule may comprise causing an override of the interruption schedule. The modification of the schedule may be caused based on the connection information satisfying one or more override rules. The one or more override rules may comprise a rule associating a connection quality parameter measurement with a threshold connection quality. The rule may indicate to override the interruption schedule if the connection quality parameter measurement may be below the threshold connection quality. Causing the modification of the interruption schedule may comprise preventing the first wireless service from being limited by the schedule.

A user may install an automation device, such as a smart lighting system at a premises. The gateway device may detect initial communications from the smart lighting system via a second wireless service, such as a Zigbee service. The gateway device may analyze the initial communications and determine that the communications are from lighting devices. The gateway device may search a settings data store and determine that lighting devices are low priority (e.g., in contrast to security devices, which may be high priority). The gateway device may determine to select an interruption schedule associated with lower priority devices, such as a schedule that has a lower duty cycle (e.g., 10%, 5% duty cycle). The gateway device may detect that a user is streaming from a gaming service. The gateway device may analyze a packet associated with a WiFi service to detect that packet has a destination associated with a high bandwidth requirement (e.g., the gaming service may be indicated as high bandwidth). In some scenarios, the bandwidth requirement may be determined based on a subscription tier level associated with a user account. The gateway device may temporarily (e.g., while the user is gaming) override the interruption schedule based on the second wireless service only having lower priority devices. The gateway device may continue to monitor connection quality parameters associated with the gaming service. If the user moves to a location within a threshold distance of the gateway device (e.g., or has an RSSI above a threshold), the interruption schedule may be re-enabled.

Figure 4:
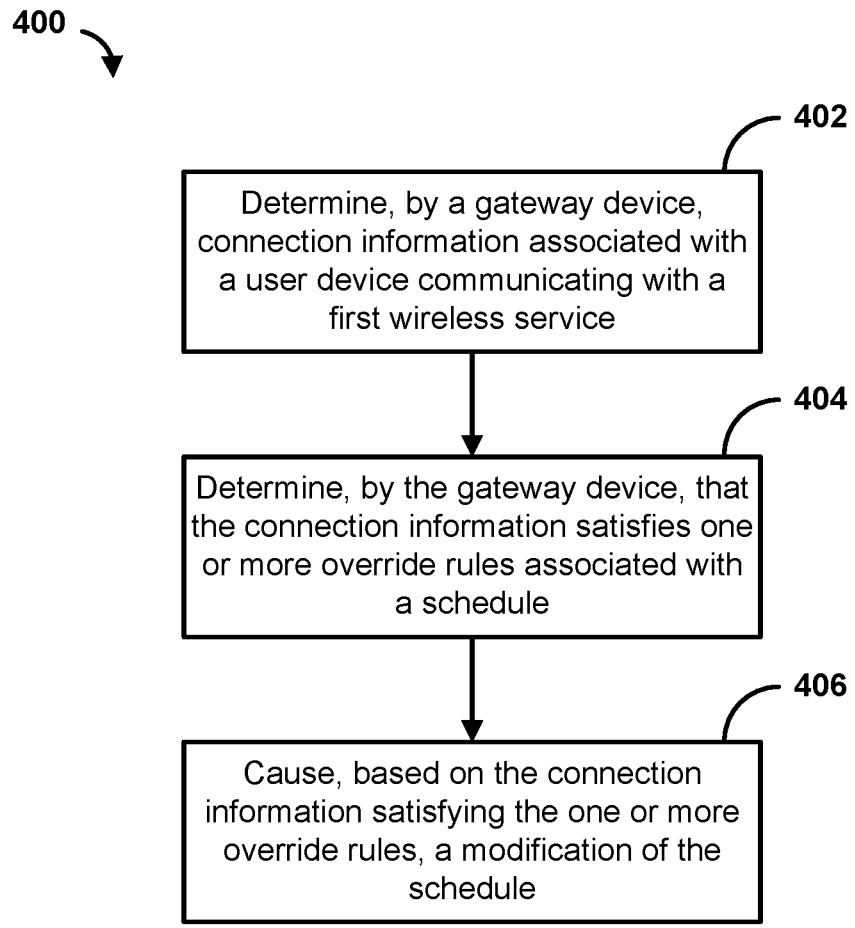
FIG. 4 shows a flowchart of an example method.

FIG. 4 shows a flowchart of an example method. The method 400 may comprise a computer implemented method for providing a service (e.g., a communication service, network service). A system and/or computing environment, such as the system 100 of FIG. 1 and/or the computing environment of FIG. 6, may be configured to perform the method 400.

A schedule may be enabled. The schedule may be associated with one or more of a first wireless service or a second wireless service. The schedule may comprise an interruption schedule associated with interrupting the first wireless service. The schedule may be enabled by a gateway device. The gateway device may be located at a premises (e.g., a customer premises). The gateway device may enable the schedule by modifying a setting of the gateway device to configure the gateway device to use the schedule. Another device, such as a server located external to the premises, a premises device (e.g., sensor, security controller) a user device, and/or the like may cause the gateway device to enable the schedule. The gateway device may comprise the first wireless service (e.g., using a first wireless radio, first protocol). The gateway device may comprise the second wireless service (e.g., using a second wireless radio or the first wireless radio, second protocol). In some implementations, the second wireless service may be comprised in an additional device different from the gateway device, such as another gateway device, an access point, a hub, and/or the like. The first wireless service may have a higher transmission power than a transmission power of the second wireless service. The first wireless service may comprise a WiFi service. The second wireless service comprises a ZigBee service, a Bluetooth service, a Z-wave service, a mesh wireless service, and/or the like.

The schedule may be enabled based on a user account setting, detection of service, installation of a premises device, activation of a service (e.g., a premise service, automation service, security service, home health service), a combination thereof, and/or the like. A determination may be made that a user account associated with the gateway device has a service associated with the second wireless service enabled. The schedule may be enabled based on determining that the user account associated with the gateway device has the service associated with the second wireless service enabled. A communication via the second wireless service may be detected. The schedule may be enabled based on the detecting of the communication via the second wireless service.

The schedule may indicate (e.g., or specify) timing information for limiting transmissions associated with the first wireless service. Limiting transmissions associated with the first wireless service may be based on (e.g., scheduled and/or used to allow, enable, provide opportunity for) transmissions associated with the second wireless service. The schedule may indicate (e.g., or specify) timing information for limiting transmissions associated with the first wireless service of the gateway device to allow (e.g., without limiting) transmissions associated with the second wireless service of the gateway device. Limiting transmissions associated with the first wireless service may comprise one or more of reducing power of the first wireless service, preventing usage of the first wireless service, or disabling the first wireless service. The schedule may comprise a duty cycle indicating (e.g., or specifying) a time length to limit transmission during a time window. The duty cycle may comprise up to a 30 percent, up to a 20 percent, and/or up to a 10 percent duty cycle.

At step 402, connection information associated with a user device communicating with the first wireless service may be determined. The connection information may be determined by the gateway device. The gateway device may measure the connection information based on a connection with the user device. The connection information may comprise one or more of a connection quality parameter or a user location parameter. The connection information may comprise physical layer (e.g., or link layer) connection information, such as a measurement of one or more of a modulation rate, a link adaptation rate, a link quality indicator, received signal strength parameter, or a proprietary link parameter. The connection information may comprise network layer information (e.g., packet information, packet type), application layer information (e.g., application using the network, application type, task being performed by the application, task type), a combination thereof, and/or the like. The connection information may be determined based on analyzing data received from the user device (e.g., via the first wireless service). The connection information (e.g., network layer information, application layer information) may be determined by analyzing a message, a message header, a packet header, a packet frame, a header field of a message, a body of a message, and/or any other data received from the user device. The connection information may comprise a type of service (e.g., video service, web service, high bandwidth service, low bandwidth service), name of a service, a combination thereof, and/or the like.

Additional connection information (e.g., associated with the second wireless service, a premises device communicating therewith) may be determined. The additional connection information may be based on analyzing a message, a message header, a packet header, a packet frame, a header field of a message, a body of a message, and/or a combination thereof. The message may be received via the second wireless service (e.g., from the premises device). Determining the additional connection information may comprise determining identifying information in a communication message. The identifying information may comprise a network address, media access control address, device identifier, device name, and/or the like (e.g., in the communication message).

At step 404, it may be determined that the connection information, the additional connection information, or a combination thereof satisfies one or more override rules associated with the schedule may be determined. The determination that the connection information satisfies the one or more override rules may be performed by the gateway device.

The one or more override rules may associate one or more override conditions with corresponding override settings. An override setting may be a configuration setting of the gateway device (e.g., that controls the operation of the first wireless service, the second wireless service, or a combination thereof). An override setting may be a setting to prevent the schedule from being implemented, a setting to disable the schedule, a setting to disable the schedule for a time period, a setting to modify the schedule, or a combination thereof.

An override condition may comprise one or more of a connection quality parameter being below a threshold, a connection quality parameter being above a threshold, a user location parameter indicating the user device is beyond a threshold distance from the gateway device, a user location parameter indicating that the user device with within a threshold distance from the gateway device, the presence of a value in a transmission, the presence of a combination of values in one or more transmissions, a value in a transmission being above, a value in transmission being below a threshold, a value in a transmission matching a value in a list of values, combination thereof, and/or the like. An example value may comprise a value in the transmission indicating and/or associated with a data requirement, such a bandwidth setting, bandwidth condition, latency setting, bit rate, content quality, content resolution, quality of service parameter, and/or the like.

An example value may comprise a header field value, network address, data field value, destination address, and/or the like. An example transmission may comprise a transmission received via the first wireless service, a transmission received via the second wireless service, a transmission received by the gateway device, a combination thereof, and/or the like.

The one or more override rules may associate the additional connection information with an override setting (e.g., or a combination of connection information and additional connection information with an override setting). Identifying information (e.g., network address, application, domain, port, session identifier, protocol) may be associated with an override setting. The identifying information (e.g., or application, domain, port, session identifier, protocol) may be associated with one or more of a quality of service requirement, a bandwidth requirement, or a latency requirement.

The one or more override rules may comprise a rule associating a connection quality parameter measurement with a threshold connection quality. The rule may indicate to override the schedule if the connection quality parameter measurement falls below the threshold connection quality.

At step 406, a modification (e.g., an override) of the schedule may be caused. Then modification of the schedule may be caused based on the connection information satisfying the one or more override rules. Causing the modification of the schedule may comprise preventing the first wireless service from being limited by the schedule.

The gateway device may be configured to communicate with a plurality of security devices at a premises. A user may associate a subset of the security devices with higher priority notifications. A door sensor, window sensor, and/or the like may be set as higher priority notifications. The gateway device may detect periodic polling messages from the door sensor. This may cause the gateway device to enable the schedule. In another scenario, creating the association of the door sensor with the higher priority notification enables the schedule. If a user is at home and watching a 4k UHD show in a remote part of the house via a WiFi radio far away from the gateway device, the gateway device may override the schedule to ensure the show does not experience quality degradation. The gateway device may detect, using connection quality parameters, a degraded connection quality with the user device watching the show. The gateway may receive location information, such as a geolocation signal, from the user device. The gateway device may compare the location of the user and/or connection quality parameters to one or more thresholds, resulting in overriding the schedule. If the user starts browsing the internet instead of watching the show, the change in bandwidth may be detected. If the bandwidth is below a threshold, the schedule may be re-enabled. If the user arms the security system, the schedule may be re-enabled to ensure that the door sensor is able to communicate with the gateway device. If the door sensor sends a door open state, a camera detects a person outside, a motion sensor detects movement outside, then the schedule may be re-enabled, and/or adjusted to make it more aggressive (e.g., more interruptions) to ensure sensors are able to communicate with the gateway device.

Figure 5:
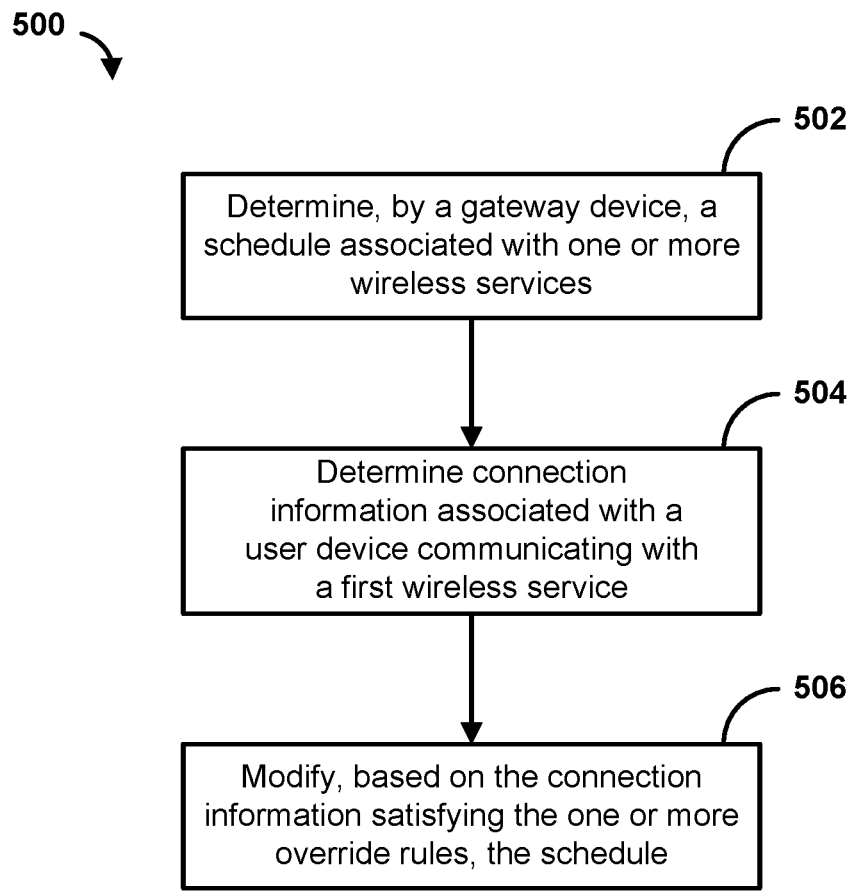
FIG. 5 shows a flowchart of an example method.

FIG. 5 shows a flowchart of an example method. The method 500 may comprise a computer implemented method for providing a service (e.g., a communication service, network service). A system and/or computing environment, such as the system 100 of FIG. 1 and/or the computing environment of FIG. 6, may be configured to perform the method 500.

At step 502, a schedule may be determined. The schedule may be associated with one or more of a first wireless service or a second wireless service. The schedule may comprise an interruption schedule associated with interrupting the first wireless service. The schedule may be determined by a gateway device. The schedule may be stored by the gateway device, and the gateway device may access the stored schedule. Determining the schedule may comprise generating a schedule based on current conditions. The gateway device may be located at a premises (e.g., a customer premises). Another device, such as a server located external to the premises, a premises device (e.g., sensor, security controller), a user device, and/or the like may cause the gateway device to determine and/or enable the schedule. The other device may send the schedule and/or and update to the schedule to the gateway device. If a user signs up for a security monitoring services associated with the schedule, the service may send the schedule to the gateway device. If the gateway device powers on (e.g., or other condition, such as multiple wireless services being used), the gateway may determine the schedule.

The gateway device may comprise (e.g., or have, be configured to implement) the first wireless service (e.g., using a first wireless radio, first protocol). The gateway device may comprise the second wireless service (e.g., using a second wireless radio or the first wireless radio, second protocol). In some implementations, the second wireless service may be comprised in an additional device different from the gateway device, such as another gateway device, an access point, a hub, and/or the like. The first wireless service may have a higher transmission power than a transmission power of the second wireless service. The first wireless service may comprise a WiFi service. The second wireless service may comprise a ZigBee service, a Bluetooth service, a Z-wave service, a mesh wireless service, and/or the like.

The schedule may indicate (e.g., or specify) timing information for limiting transmissions associated with the first wireless service. Limiting transmissions associated with the first wireless service may be based on (e.g., scheduled and/or used to allow, enable, provide opportunity for) transmissions associated with the second wireless service. Limiting transmission associated with the first wireless service may comprise one or more of reducing power of the first wireless service, preventing usage of the first wireless service, disabling the first wireless service, a pausing the first wireless service, or combination thereof. The schedule may not modify operations of the second wireless service. The schedule may indicate (e.g., or specify) timing information for limiting transmissions associated with the first wireless service to allow (e.g., without limiting) transmissions associated with the second wireless service. The schedule may comprise a duty cycle indicating (e.g., or specifying) a time length to limit transmission during a time window. The duty cycle may comprise up to a 30 percent, up to a 20 percent, and/or up to a 10 percent duty cycle.

The schedule may be enabled based on a user account setting, detection of service, installation of a premises device, activation of a service (e.g., a premise service, automation service, security service, home health service), a combination thereof, and/or the like. A determination may be made that a user account associated with the gateway device has a service associated with the second wireless service enabled. Determining the schedule may comprise determining the schedule based on determining that the user account associated with the gateway device has the service associated with the second wireless service enabled. A communication via the second wireless service may be detected. Determining the schedule may comprise determining the schedule based on the detecting of the communication via the second wireless service.

At step 504, connection information associated with the first wireless service may be determined. The connection information may be associated with a user device communicating with the first wireless service. The connection information may comprise one or more of a connection quality parameter, a user location parameter, or a combination thereof. The connection information may comprise physical layer (e.g., or link layer) connection information, such as a measurement of one or more of a modulation rate, a link adaptation rate, a link quality indicator, received signal strength parameter, or a proprietary link parameter. The connection information may comprise network layer information (e.g., packet information, packet type), application layer information (e.g., application using the network, application type, task being performed by the application, task type), a combination thereof, and/or the like. The connection information may be determined based on analyzing data received from the user device (e.g., via the first wireless service). The connection information (e.g., network layer information, application layer information) may be determined by analyzing a message, a message header, a packet header, a packet frame, a header field of a message, a body of a message, and/or any other data received from the user device. The connection information may comprise a type of service (e.g., video service, web service, high bandwidth service, low bandwidth service), name of a service, a combination thereof, and/or the like.

Additional connection information (e.g., associated with the second wireless service, a premises device communicating therewith) may be determined. The additional connection information may be based on analyzing a message, a message header, a packet header, a packet frame, a header field of a message, a body of a message, and/or a combination thereof. The message may be received via the second wireless service (e.g., from the premises device). Determining the additional connection information may comprise determining identifying information in a communication message. The identifying information may comprise a network address, media access control address, device identifier, device name, and/or the like (e.g., in the communication message).

The one or more override rules may associate the connection information, the additional connection information (e.g., identifying information, the network address), or a combination thereof with an override setting. The additional connection information (e.g., identifying information, network address) may be associated with one or more of a quality of service requirement, a bandwidth requirement, or a latency requirement.

The one or more override rules may comprise a rule associating a connection quality parameter measurement with a threshold connection quality. The rule may indicate modifying the schedule if the connection quality parameter measurement is below the threshold connection quality. The one or more override rules may comprise a rule associating a file size, resolution, quality of service, service type, packet type, application, application type, a combination thereof with a setting to not modify the connection quality parameter. The one or more override rules may comprise a rule associating a file size, resolution, quality of service, service type, packet type, application, application type, or a combination thereof with a setting to modify the connection quality parameter. An example rule may comprise a threshold file size. If the file size is above the threshold, the rule may indicate to not modify the schedule. If the file size is below the threshold, the rule may indicate to modify the schedule. An example rule may comprise a bandwidth threshold. If the bandwidth and/or bandwidth requirement is above the threshold, the rule may indicate to not modify the schedule. If a bandwidth and/or bandwidth requirement is below the threshold, the rule may indicate to modify the schedule.

At step 506, the schedule may be modified. The schedule may be modified based on the connection information (e.g., associated with the user device, the first wireless service), the additional connection information (e.g., associated with the premises device, the second wireless service), and/or a combination thereof. The schedule may be modified based on the connection information satisfying the one or more override rules. Modifying the schedule may comprise preventing the first wireless service from being limited by the schedule, disabling the schedule, changing a duty cycle parameter of the schedule, changing a frequency of the first wireless service, changing a length of interruption of the first wireless service, delaying the schedule, or a combination thereof.

Figure 6:
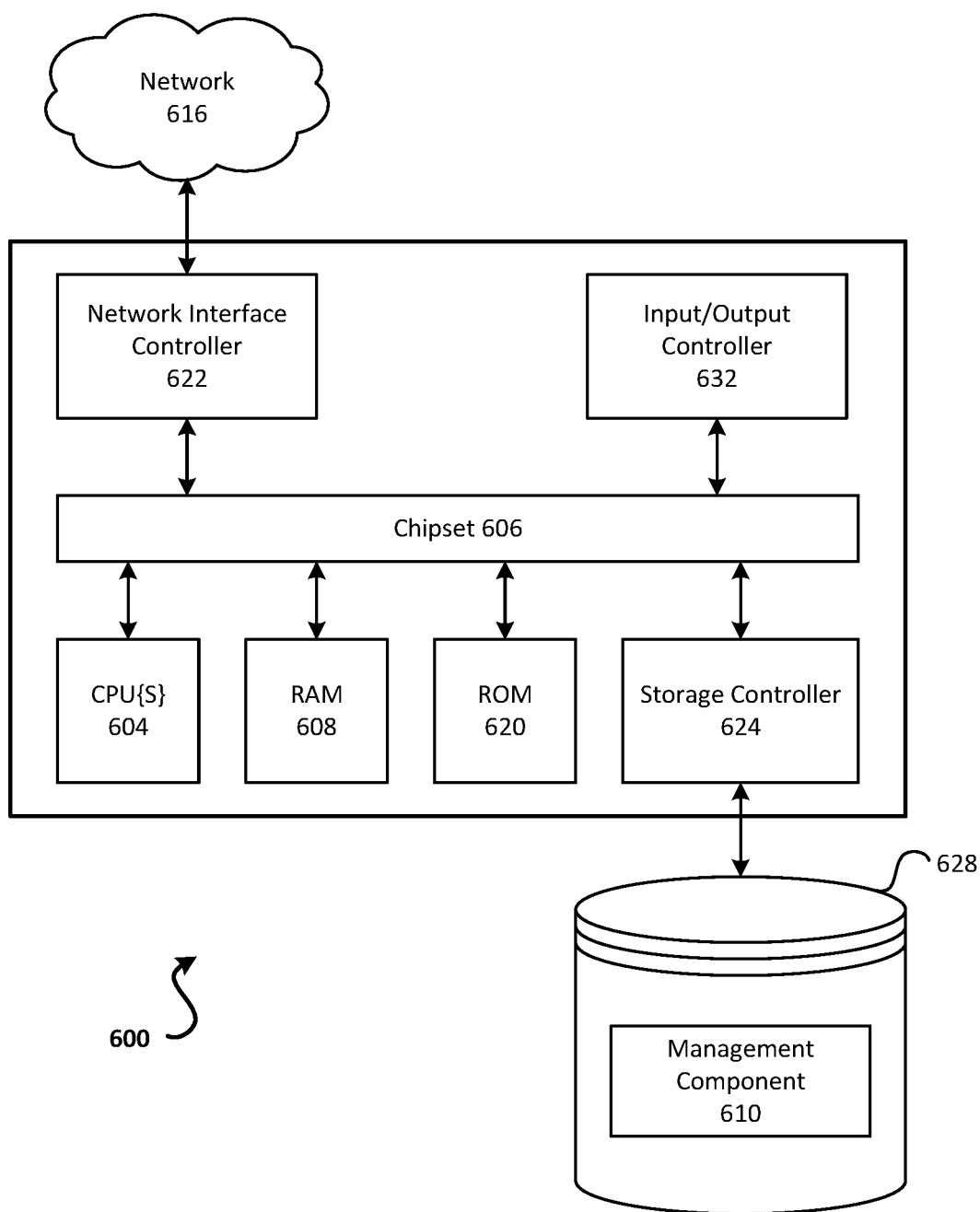
FIG. 6 is a block diagram illustrating an example computing device.

FIG. 6 depicts a computing device that may be used in various aspects, such as the servers, modules, and/or devices depicted in FIG. 1. With regard to the example architecture of FIG. 1, the server device 102, the gateway device 104, the user device 106, the first premises device 108, the second premises device 110 may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 2A, FIG. 2B, FIG. 3, FIG. 4, and FIG. 5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described above, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described above. The computing device 600 may have access to computer-readable storage media storing computer-executable instructions, which, when executed by the computing device 600, may perform the methods described in relation to FIG. 2A, FIG. 2B, FIG. 3, FIG. 4, and FIG. 5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
    enabling, by a gateway device, an interruption schedule, wherein the interruption schedule indicates timing information for limiting transmissions associated with a first wireless service, and wherein limiting transmissions associated with the first wireless service is based on transmissions associated with a second wireless service;
    determining connection information associated with a user device communicating with the first wireless service; and
    causing, based on the connection information satisfying one or more override rules indicating to override the interruption schedule if a connection quality parameter measurement of the connection information is below a threshold connection quality, an override of the interruption schedule.

2. The method of claim 1, wherein limiting transmission associated with the first wireless service comprises one or more of reducing power of the first wireless service, preventing usage of the first wireless service, or disabling the first wireless service.

3. The method of claim 1, wherein the interruption schedule comprises a duty cycle indicating a time length to limit transmission during a time window.

4. The method of claim 1, further comprising determining that a user account associated with the gateway device has a service associated with the second wireless service enabled, wherein enabling the interruption schedule comprises enabling the interruption schedule based on determining that the user account associated with the gateway device has the service associated with the second wireless service enabled.

5. The method of claim 1, wherein the connection information comprises a measurement of one or more of the connection quality parameter, a user location parameter, a modulation rate, a link adaptation rate, a link quality indicator, a received signal strength parameter, or a proprietary link parameter.

6. The method of claim 1, further comprising determining identifying information in a communication message received via the second wireless service, and wherein at least one of the one or more override rules associate the identifying information with an override setting.

7. A method comprising:
    determining, by a gateway device, connection information associated with a user device communicating with a first wireless service;
    determining, by the gateway device, that the connection information satisfies one or more override rules indicating to override an interruption schedule if a connection quality parameter measurement of the connection information is below a threshold connection quality, wherein the interruption schedule indicates timing information for limiting transmissions associated with the first wireless service, and wherein limiting transmission associated with the first wireless service is based on transmissions associated with a second wireless service; and
    causing, based on the connection information satisfying the one or more override rules, an override of the interruption schedule.

8. The method of claim 7, wherein limiting transmissions associated with the first wireless service comprises one or more of reducing power of the first wireless service, preventing usage of the first wireless service, or disabling the first wireless service.

9. The method of claim 7, wherein the interruption schedule comprises a duty cycle indicating a time length to limit transmission during a time window.

10. The method of claim 7, further comprising:
determining that a user account associated with the gateway device has a service associated with the second wireless service enabled; and
enabling, based on determining that the user account associated with the gateway device has the service associated with the second wireless service enabled, the interruption schedule.

11. The method of claim 7, wherein the connection information comprises a measurement of one or more of the connection quality parameter, a user location parameter, a modulation rate, a link adaptation rate, a link quality indicator, received signal strength parameter, or a proprietary link parameter.

12. The method of claim 7, further comprising determining identifying information in a communication message received via the second wireless service, and wherein at least one of the one or more override rules associate the identifying information with an override setting.

13. A method comprising:
determining, by a gateway device, an interruption schedule indicating timing information for limiting transmissions associated with a first wireless service, wherein limiting transmission associated with the first wireless service is based on transmissions associated with a second wireless service;
determining connection information associated with a user device communicating with the first wireless service; and
causing, based on the connection information satisfying one or more override rules indicating to override the interruption schedule if a connection quality parameter measurement of the connection information is below a threshold connection quality, an override of the interruption schedule.

14. The method of claim 13, wherein limiting transmission associated with the first wireless service comprises one or more of reducing power of the first wireless service or preventing usage of the first wireless service.

15. The method of claim 13, further comprising determining that a user account associated with the gateway device has a service associated with the second wireless service enabled, wherein determining the interruption schedule comprises determining the interruption schedule based on determining that the user account associated with the gateway device has the service associated with the second wireless service enabled.

16. The method of claim 13, further comprising determining identifying information in a communication message received via the second wireless service, and wherein at least one of the one or more override rules associate the identifying information with an override setting.

17. The method of claim 13, wherein causing the override of the interruption schedule comprises one or more of preventing the first wireless service from being limited by the interruption schedule, disabling the interruption schedule, changing a duty cycle parameter of the interruption schedule, changing a frequency of interruption of the first wireless service, changing a length of interruption of the first wireless service, or delaying the interruption schedule.

* * * * *